United States Patent [19]

Zhao

[11] Patent Number: 5,779,336
[45] Date of Patent: Jul. 14, 1998

[54] LIQUID CRYSTAL DISPLAY WITH PROJECTING FUNCTION

[76] Inventor: Michael Zhao, 9682 Telstar Ave., El Monte, Calif. 91731

[21] Appl. No.: 798,554

[22] Filed: Feb. 11, 1997

[30] Foreign Application Priority Data

Dec. 26, 1996 [CN] China ............................ 96 2 49524.7

[51] Int. Cl.$^6$ .................................................. G03B 21/14
[52] U.S. Cl. .................................... 353/119; 353/DIG. 3
[58] Field of Search ........................ 353/119, DIG. 3, 353/98

[56] References Cited

U.S. PATENT DOCUMENTS

| | | | |
|---|---|---|---|
| 4,880,303 | 11/1989 | Grunwald | 353/119 |
| 4,882,599 | 11/1989 | Grunwald | 353/119 |
| 5,090,800 | 2/1992 | Ushiro | 353/119 |
| 5,639,152 | 6/1997 | Nelson | 353/119 |

*Primary Examiner*—William Dowling
*Attorney, Agent, or Firm*—Bacon & Thomas

[57] ABSTRACT

A liquid crystal display with projecting function including an open-top box body with enclosed sides, a projection light source, a condensing lens, a liquid crystal display plate, a relay plate, a reflective lens and a back light plate. The projection light source is disposed at the bottom side of the box body. The condensing lens is disposed in the box body above the projection light source. The liquid crystal display plate has one side connected to a display light source and the other side connected to the box body. The reflective lens is secured below the relay plate. The back light plate is secured above the relay plate. The relay plate, reflective lens and the back light plate may be closed and accommodated in the box body between the liquid crystal display plate and the condensing lens for displaying purposes. They may also be obliquely disposed on the upper side of the liquid crystal display plate for projection purposes.

5 Claims, 5 Drawing Sheets

LIQUID CRYSTAL DISPLAY WITH PROJECTING FUNCTION

BACKGROUND OF THE INVENTION (a) Field of the Invention

The present invention relates generally to a computer display, and more particularly to a computer liquid crystal display which has the function of a projector.

(b) Description of the Prior Art

Existing computer liquid crystal displays are generally an oblong box having a liquid crystal display plate at an upper side and a back light plate at the lower side, with a light source disposed therebetween. They are connected to the computer mainframes to display information and data.

To manufacturers who are trying to develop information products so as to obtain the maximum functions with the smallest hardware structures, existing liquid crystal displays which have only a single function of displaying information and data and are therefore comparatively costly allow room for development. A most possible way is to endow the liquid crystal display with the function of a projector for projecting the information, data, graphics, etc., contained in the notebook computer for viewing.

SUMMARY OF THE INVENTION

A primary object of the present invention is to provide a liquid crystal display which may be used for displaying or projection purposes.

In order to achieve the above-mentioned object, the liquid crystal display according to the present invention essentially comprises an open-top box body with enclosed sides, a projection light source, a condensing lens, a liquid crystal display plate, a relay plate, a reflective lens and a back light plate. The projection light source is disposed at the bottom side of the box body. The condensing lens is disposed in the box body above the projection light source. The liquid crystal display plate has one side connected to a display light source and the other side connected to the box body. The reflective lens is secured below the relay plate. The back light plate is secured above the relay plate. The relay plate, reflective lens and the back light plate may be closed and accommodated in the box body between the liquid crystal display plate and the condensing lens for displaying purposes. They may also be obliquely disposed on the upper side of the liquid crystal display plate for projection purposes.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
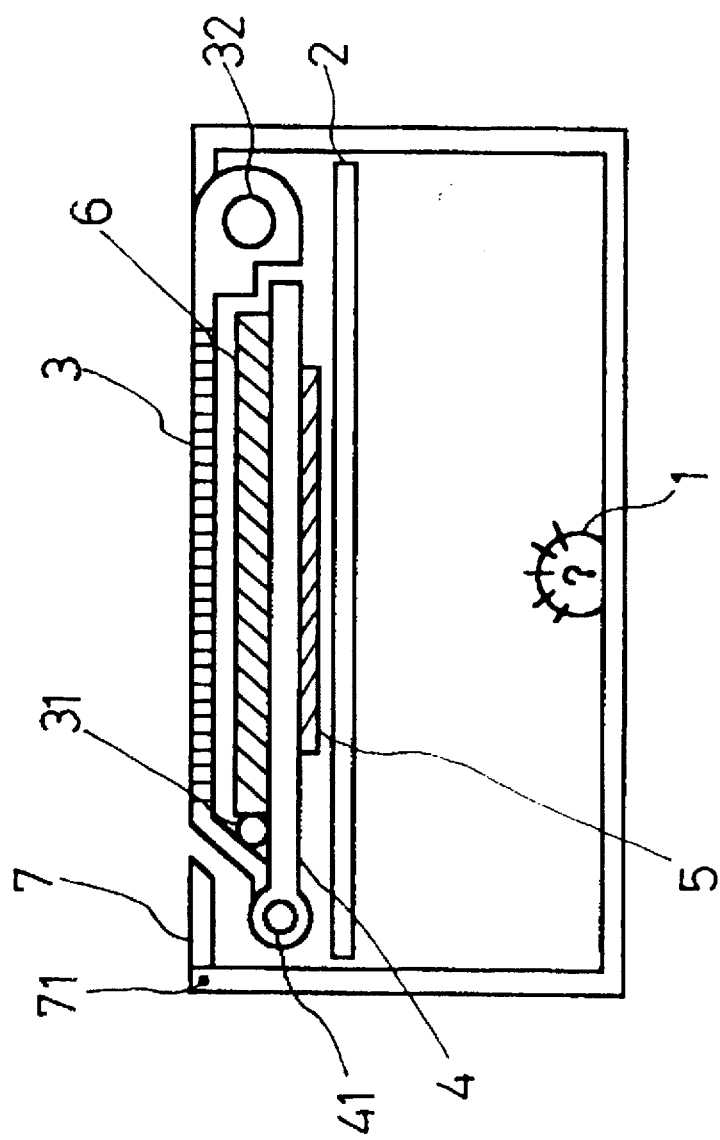
FIG. 1 is a sectional view of the present invention in a closed state when used merely for displaying information.

With reference to the drawings, the present invention essentially comprises an oblong box body having all sides enclosed except the top. A projection projection light source 1 is provided at the bottom side of the box body with a condensing lens 2 disposed thereabove. A liquid crystal display (liquid crystal display) plate 3 is disposed at the top of the box body, and a relay plate 4 is provided between the condensing lens 2 and the liquid crystal display plate 3. A reflective lens 5 is further disposed between the relay plate 4 and the condensing lens 2, and a back light plate 6 is arranged between the relay plate 4 and the liquid crystal display plate 3.

The projection light source 1 is a luminous body for providing light for projection purposes. Therefore, it should be understood that the present invention is equipped with the necessary circuits and switches for controlling the projection light source 1.

The condensing lens 2 is provided for focusing the light emitted from the projection light source 1 and projecting the same onto the reflective lens 5.

The liquid crystal display plate 3 is a conventional structure and may be connected to the computer mainframe for displaying information and data. The liquid crystal display plate 3 has a display light source 31 disposed at one side thereof to provide light necessary for displaying. The other side of the liquid crystal display plate 3 is connected to a wall surface of the box body by means of an axle 32 such that the liquid crystal display plate 3 may turn about the axle 32 on the box body. By means of this arrangement, the liquid crystal display plate 3 and the display light source 31 may be opened or closed relative to the box body.

The relay plate 4 is provided with an axle 41 at the side opposite to the axle 32 of the liquid crystal display plate 3 and is pivotally connected to the liquid crystal display plate 3 such that the relay plate 4 may turn relative to the liquid crystal display plate 3.

The reflective lens 5 is connected to the lower side of the relay plate 4 for reflecting images during projection. The reflective lens 5 therefore has a smooth and sleek surface.

The back light plate 6 is connected to the upper side of the relay plate 4 for passage of light during display of information so that the display light source 31 may completely shine through the liquid crystal display plate 3 to obtain a better resolution.

Figure 2:
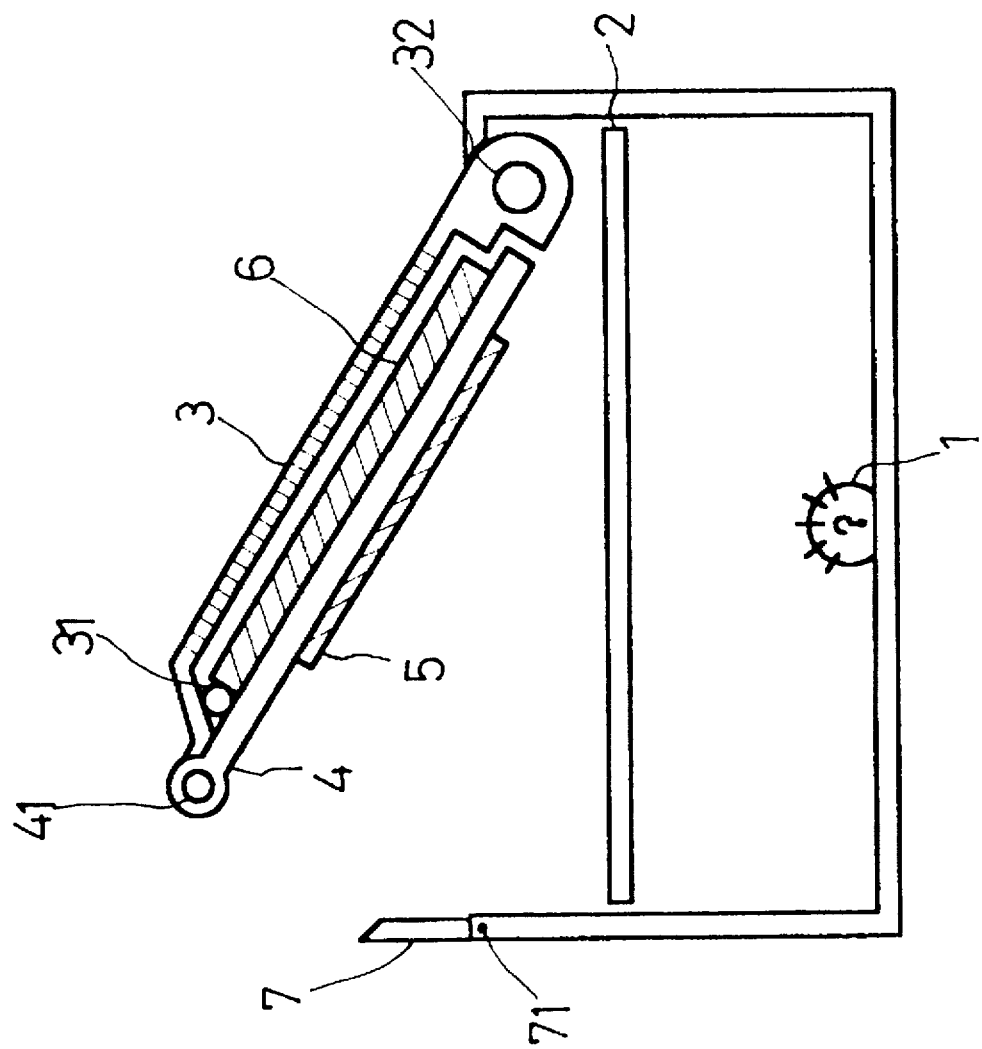
FIG. 2 is a sectional view of the present invention when the liquid crystal display is opened for projection purposes.
Figure 3:
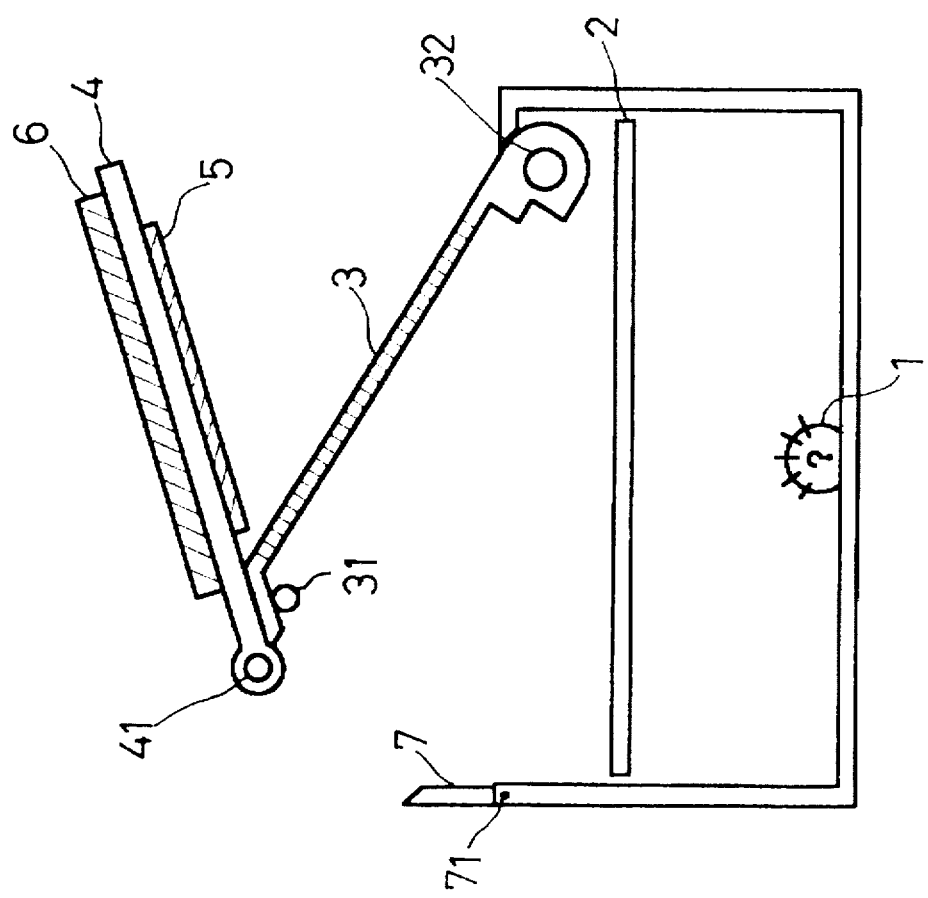
FIG. 3 is a sectional view of the present invention when a relay plate is turned to the other side during projection.
Figure 4:
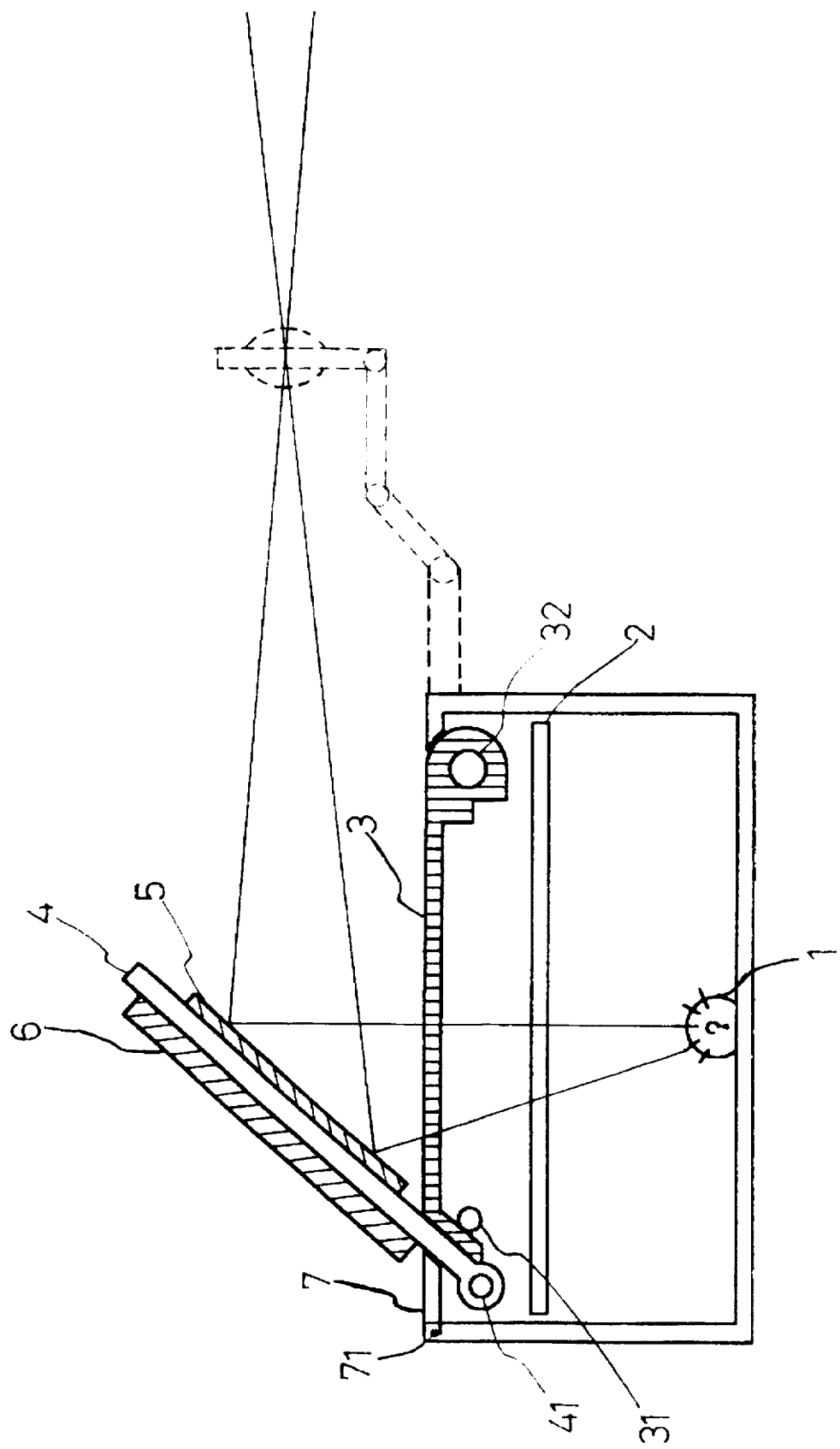
FIG. 4 is a sectional view of the present invention during projection.

Referring to FIG. 2, which illustrates the invention used as a projector, by means of the axle 32, the liquid crystal display plate 3 together with the relay plate 4, and the reflective lens 5 and back light plate 6 connected to the relay plate 4 are turned over to the upper side of the box body. Then, as shown in FIG. 3, the relay plate 4 together with the reflective lens 5 and the back light plate 6 are turned through an angle of 180 degrees. Next the liquid crystal display plate 3 is turned back to lie in a horizontal manner above the box body, while the relay plate 4 along with the reflective lens 5 and the back light plate 6 are arranged in a slanting position suitable for projection, as shown in FIG. 4. By means of the above arrangement, light from the projection light source may may, after being focused by the condensing lens 2, project through the liquid crystal display plate 3 onto the reflective lens 5 and further onto a projection frame (as shown by imaginary lines) and a screen.

In order to shield the light during operation, as shown in the drawings, a shielding plate 7 may be pivotally connected to the box body by means of an axle 71 at the side opposite to the axle 32 such that the shielding plate 7 may be turnable upon the box body.

From the foregoing, it can be seen that the present invention may be used not only as a liquid crystal display but also as a projector due to the arrangement of the axle 32 of the liquid crystal display plate 3 and the axle 41 of the relay plate 4. This is indeed a breakthrough in the field.

Figure 5:
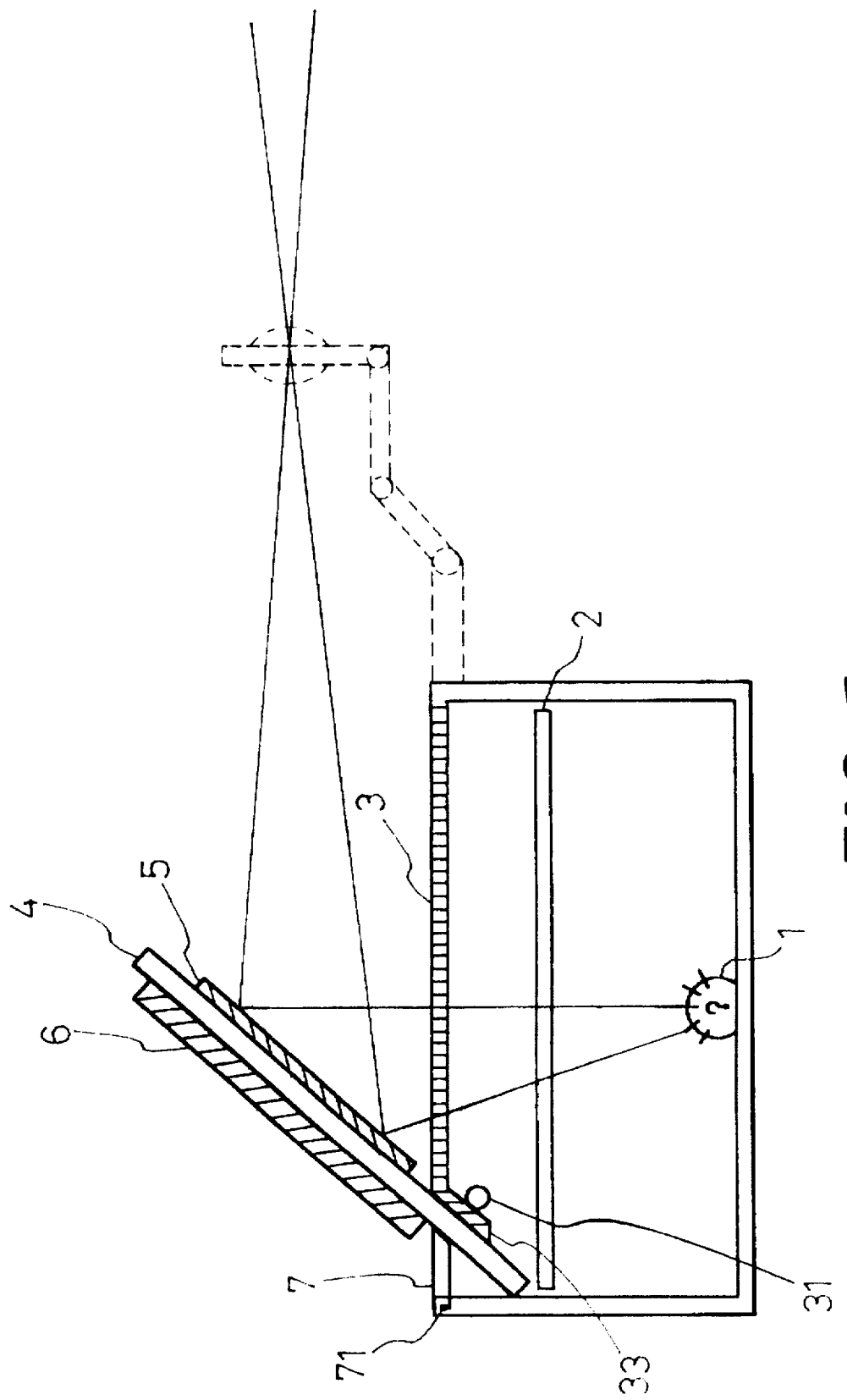
FIG. 5 is a sectional view of another preferred embodiment of the present invention.

Another preferred embodiment of the invention which is more convenient to operate is shown in FIG. 5. The relay plate 4, the reflective lens 5 and the back light plate 6 are fixedly connected such that, when they are not in use, they may be accommodated between the liquid crystal display plate 3 and the condensing lens 2. Besides, known slide rails or similar structures may be provided at the side walls of the box body. For projection use, they may be obliquely arranged in a gap between a slanting plate 33 at one end of the liquid crystal display plate 3 and the shielding axle 71. Known positioning means may further be provided. In this way, the axle 32 of the liquid crystal display plate 3 and the axle 41 of the relay plate 4 may be dispensed with. The axle 71 may also be fixed to achieve similar effects.

Although the present invention has been illustrated and described with reference to the preferred embodiment thereof, it should be understood that it is in no way limited to the details of such embodiment but is capable of numerous modifications within the scope of the appended claims.

What is claimed is:

1. A liquid crystal display with projecting function in the form of a box body with enclosed sides except at the top, said liquid crystal display comprising:

a projection light source provided at the bottom side of said box body for providing light necessary for projection purposes;

a condensing lens disposed in said box body above said projection light source;

a liquid crystal display plate connected to a computer mainframe, said liquid crystal display plate being connected to a display light source at one side and a top side of said box body at the other side;

a relay plate;

a reflective lens fixedly connected to a lower side of said relay plate;

a back light plate fixedly connected to an upper side of said relay plate;

said relay plate, said reflective lens and said back light plate being closable and accommodated in between said liquid crystal display plate and said condensing lens; said relay plate, said reflective lens and said back light plate being obliquely disposed at the upper side of said liquid crystal display plate, whereby light from said projection light source may pass through said condensing lens, said liquid crystal display plate and said reflective lens for projection purposes.

2. A liquid crystal display as claimed in claim 1, wherein said liquid crystal display plate has one side extending obliquely downward to form a slanting plate, and said box body has a shielding plate extending inwardly from an upper end thereof, such that a gap is defined between said slanting plate and said shielding plate for accommodating said relay plate.

3. A liquid crystal display as claimed in claim 1, wherein one side of said liquid crystal display plate is pivotally connected via an axle to said box body with the other side thereof pivotally connected to said relay plate via an axle of said relay plate, such that said liquid crystal display plate may turn relative to said box body whereas said relay plate may turn relative to said liquid crystal display plate.

4. A liquid crystal display as claimed in claim 3, wherein one end of said liquid crystal display plate may slant obliquely downward to form a slanting plate connected to said axle of said relay plate.

5. A liquid crystal display as claimed in claim 1, wherein a shielding plate is disposed at the upper side of said box body at a position corresponding to said axle of said relay plate, said shielding plate being connected to said box body via an axle such that it may turn thereon.

* * * * *